US012579954B2

(12) United States Patent
Higuchi

(10) Patent No.: US 12,579,954 B2
(45) Date of Patent: Mar. 17, 2026

(54) LIQUID DISPLAY APPARATUS AND CONTROL METHOD

(71) Applicant: JVCKENWOOD Corporation, Yokohama (JP)

(72) Inventor: Jun Higuchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/095,354

(22) Filed: Mar. 31, 2025

(65) Prior Publication Data

US 2025/0308477 A1 Oct. 2, 2025

(30) Foreign Application Priority Data

Apr. 1, 2024 (JP) ................................ 2024-058885

(51) Int. Cl.
*G09G 3/36* (2006.01)

(52) U.S. Cl.
CPC ... *G09G 3/3614* (2013.01); *G09G 2310/0286* (2013.01); *G09G 2310/0291* (2013.01); *G09G 2310/0294* (2013.01); *G09G 2310/08* (2013.01); *G09G 2330/021* (2013.01); *G09G 2330/025* (2013.01)

(58) Field of Classification Search
CPC .. G09G 3/3648; G09G 3/3614; G09G 3/3688; G09G 2330/021
See application file for complete search history.

(56) References Cited

U.S. PATENT DOCUMENTS

| | | | | |
|---|---|---|---|---|
| 11,444,552 | B2 * | 9/2022 | Katoh | H02M 1/0025 |
| 2009/0121993 | A1 * | 5/2009 | Masumura | G09G 3/3614 345/88 |
| 2021/0072608 | A1 * | 3/2021 | Iwasa | G09G 3/006 |
| 2021/0074235 | A1 * | 3/2021 | Iwasa | G09G 3/3696 |
| 2021/0149264 | A1 * | 5/2021 | Iwasa | G02F 1/136286 |
| 2025/0308477 | A1 * | 10/2025 | Higuchi | G09G 3/3688 |

FOREIGN PATENT DOCUMENTS

| | | |
|---|---|---|
| JP | 2009-223289 A | 10/2009 |

* cited by examiner

*Primary Examiner* — Van N Chow
(74) *Attorney, Agent, or Firm* — Shih IP Law Group, PLLC

(57) ABSTRACT

The polarity switching control circuit causes the first switch to conduct intermittently at each predetermined unit period, in a first period in the vertical scanning period, causes the second switch to conduct intermittently at each unit period, in a second period following the first period, and intermittently induces a bias current in the first buffer circuit and the second buffer circuit in synchronization with conduction of the first switch or the second switch. In each of the first period and the second period, the polarity switching control circuit causes the bias current to be equal to a reference value in some of a plurality of unit periods and decreases the bias current from the reference value in the remaining unit periods.

8 Claims, 7 Drawing Sheets

100

(COMPARATIVE EXAMPLE)

LIQUID DISPLAY APPARATUS AND CONTROL METHOD

CROSS-REFERENCE TO RELATED APPLICATION

This application is based upon and claims the benefit of priority from the prior Japanese Patent Application No. 2024-058885, filed on Apr. 1, 2024, the entire contents of which are incorporated herein by reference.

BACKGROUND

1. Field

The present disclosure relates to a liquid crystal display apparatus and a control method.

2. Description of the Related Art

Patent Literature 1 discloses a liquid crystal display apparatus that switches between a positive polarity video signal held in a holding capacitance and a negative polarity video signal held in another holding capacitance at a predetermined period shorter than the vertical scanning period and alternately applies the signal to the pixel drive electrode of the liquid crystal element.

[Patent Literature 1] JP 2009-223289

It is desired to reduce power consumption in a liquid crystal display apparatus that switches between a positive polarity video signal and a negative polarity video signal multiple times within the vertical scanning period.

SUMMARY

The liquid crystal display apparatus according to an embodiment includes: a plurality of pixels provided at intersections where a plurality of sets of data wirings, each set being comprised of two data wirings, and a plurality of gate wirings intersect; a plurality of sets of selection switches provided respectively for the plurality of sets of data wirings and adapted to supply a positive polarity video signal to one of the two data wirings in a set and supply a negative polarity video signal to the other data wiring such that the plurality of sets of selection switches sequentially supply the signals to the plurality of sets of data wirings set by set; a horizontal drive circuit that sequentially drives the plurality of sets of selection switches set by set within a horizontal scanning period; a vertical drive circuit that sequentially drives the plurality of gate wirings in each horizontal scanning period; and a polarity switching control circuit. Each of the plurality of pixels includes: a liquid crystal element in which a liquid crystal layer is sandwiched between a pixel drive electrode and a common electrode that face each other; a first holding unit that samples and holds the positive polarity video signal of a corresponding data wiring; a first buffer circuit that receives the positive polarity video signal held in the first holding unit; a first switch during conduction applies the positive polarity video signal output from the first buffer circuit to the pixel drive electrode; a second holding unit that samples and holds the negative polarity video signal of a corresponding data wiring; a second buffer circuit that receives the negative polarity video signal held in the second holding unit; and a second switch during conduction applies the negative polarity video signal output from the second buffer circuit to the pixel drive electrode. The polarity switching control circuit causes the first switch to conduct intermittently at each predetermined unit period, in a first period in the vertical scanning period, causes the second switch to conduct intermittently at each unit period, in a second period following the first period in the vertical scanning period, intermittently induces a bias current in the first buffer circuit and the second buffer circuit in synchronization with conduction of the first switch or the second switch, and in each of the first period and the second period, causes the bias current to be equal to a reference value in some of a plurality of unit periods and decreases the bias current from the reference value in the remaining unit periods.

Another aspect of the present embodiment disclosure is a control method. The method is a control method in a liquid crystal display apparatus, the liquid crystal display apparatus including: a plurality of pixels provided at intersections where a plurality of sets of data wirings, each set being comprised of two data wirings, and a plurality of gate wirings intersect; a plurality of sets of selection switches provided respectively for the plurality of sets of data wirings and adapted to supply a positive polarity video signal to one of the two data wirings in a set and supply a negative polarity video signal to the other data wiring such that the plurality of sets of selection switches sequentially supply the signals to the plurality of sets of data wirings set by set; a horizontal drive circuit that sequentially drives the plurality of sets of selection switches set by set within a horizontal scanning period; and a vertical drive circuit that sequentially drives the plurality of gate wirings in each horizontal scanning period. Each of the plurality of pixels includes: a liquid crystal element in which a liquid crystal layer is sandwiched between a pixel drive electrode and a common electrode that face each other; a first holding unit that samples and holds the positive polarity video signal of a corresponding data wiring; a first buffer circuit that receives the positive polarity video signal held in the first holding unit; a first switch during conduction applies the positive polarity video signal output from the first buffer circuit to the pixel drive electrode; a second holding unit that samples and holds the negative polarity video signal of a corresponding data wiring; a second buffer circuit that receives the negative polarity video signal held in the second holding unit; and a second switch during conduction applies the negative polarity video signal output from the second buffer circuit to the pixel drive electrode. The control method includes: causing the first switch to conduct intermittently at each predetermined unit period, in a first period in the vertical scanning period, causing the second switch to conduct intermittently at each unit period, in a second period following the first period in the vertical scanning period, intermittently inducing a bias current in the first buffer circuit and the second buffer circuit in synchronization with conduction of the first switch or the second switch, and in each of the first period and the second period, causing the bias current to be equal to a reference value in some of a plurality of unit periods and decreases the bias current from the reference value in the remaining unit periods.

Optional combinations of the aforementioned constituting elements, and implementations of the embodiments in the form of methods, apparatuses, systems, recording mediums, and computer programs may also be practiced as modes of the embodiments.

DETAILED DESCRIPTION

The invention will now be described by reference to the preferred embodiments. This does not intend to limit the scope of the present invention, but to exemplify the invention.

A description will be given of an embodiment to practice the present disclosure with reference to the drawings. The numerals are used in the description to denote the same elements, and a duplicate description is omitted as appropriate.

First Embodiment

Figure 1:
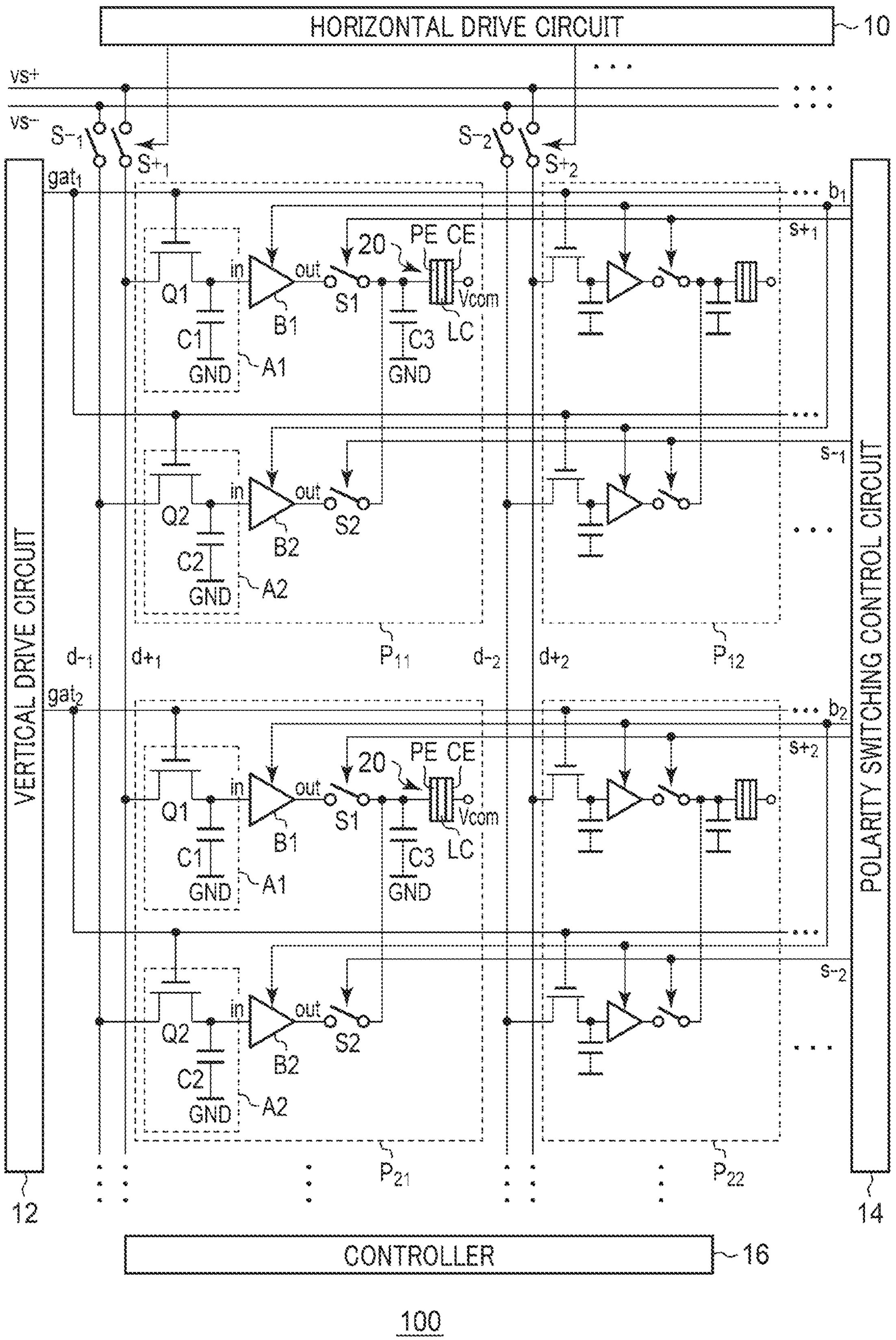
FIG. 1 schematically shows a configuration of the liquid crystal display apparatus of the first embodiment.

FIG. 1 schematically shows a configuration of the liquid crystal display apparatus 100 of the first embodiment. The liquid crystal display apparatus 100 includes a plurality of pixels $P_{11}$, $P_{12}$, $P_{21}$, $P_{22}$, . . . , $P_{nm}$ (n and m denote natural numbers), a plurality of sets of selection switches $S+_1$, $S-_1$, $S+_2$, $S-_2$, . . . , $S+_m$, $S-_m$, a horizontal drive circuit 10, a vertical drive circuit 12, a polarity switching control circuit 14, and a controller 16.

The plurality of pixels $P_{11}$, . . . , and $P_{nm}$ are arranged in a matrix. "n" denotes the number of pixels in the vertical direction (also called the column direction). "m" denotes the number of pixels in the horizontal direction (also called the row direction). "n" and "m" are appropriately defined according to the resolution of the liquid crystal display apparatus 100. For example, "n" may be 720, and "m" may be 1280. Referring to FIG. 1, four pixels $P_{11}$, $P_{12}$, $P_{21}$, and $P_{22}$ among the plurality of pixels are shown, and illustration of other pixels are omitted. With regard to wirings connected to the plurality of pixels, too, those that are connected to these four pixels are shown, and illustration of other wirings is omitted. FIG. 1 also shows a schematic arrangement of pixels and wirings.

In the first row, a plurality of pixels $P_{11}$, $P_{12}$, . . . , and $P_{1m}$ are arranged. In the second row, a plurality of pixels $P_{21}$, $P_{22}$, . . . and $P_{2m}$ are arranged. In the i-th (i denotes an integer from 1 to n) row, a plurality of pixels $P_{11}$, $P_{12}$, . . . , and $P_{1m}$ are arranged.

m sets of data wirings $d+_1$, $d-_1$, $d+_2$, $d-_2$, . . . , $d+_m$, $d-_m$, each set being comprised of two data wirings $d+_j$, $d-_j$ (j denotes an integer from 1 to m), extend in the column direction and are arranged in the row direction. n gate wirings $gat_1$, $gat_2$, . . . , $gat_n$ extend in the row direction and are arranged in the column direction. The plurality of pixels $P_{11}$, . . . , $P_{nm}$ are provided at the intersections where the m sets of data wirings $d+_1$, $d-_1$, . . . , $d+_m$, $d-_m$ and the n gate wirings $gat_1$, $gat_n$ intersect.

m sets of selection switches $S+_1$, $S-_1$, . . . , $S+_m$, $S-_m$, each set being comprised of two selection switches $S+_j$, $S-_j$ (j denotes an integer from 1 to m), are provided respectively for the m sets of data wirings $d+_1$, $d-_1$, . . . , $d+_m$, $d-_m$. The m sets of selection switches $S+_1$, $S-_1$, . . . , $S+_m$, $S-_m$ supply a positive polarity video signal input to the positive polarity signal wiring vs+ to one of the two data wirings in a set and supply a negative polarity video signal input to the negative polarity signal wiring vs− to the other data wiring such that the m sets of selection switches supply the signals to the m sets of data wirings set by set.

The horizontal drive circuit 10 sequentially drives the m sets of selection switches $S+_1$, $S-_1$, . . . , $S+_m$, $S-_m$ and causes them to conduct set by set within the horizontal scanning period. The vertical drive circuit 12 sequentially drives the n gate wirings $gat_1$, . . . , $gat_n$ in each horizontal scanning period.

The controller 16 supplies various clock signals, generated to synchronize with the positive polarity video signal input to the positive polarity signal wiring vs+ and the negative polarity video signal input to the negative polarity signal wiring vs−, to the horizontal drive circuit 10, the vertical drive circuit 12, and the polarity switching control circuit 14 (the path is not shown). The controller 16 performs pixel selection accompanying horizontal scanning and vertical scanning, by driving the data wirings and the gate wirings in synchronization with the positive polarity video signal and the negative polar video signal, respectively. Since a known technology can be used to drive the data wirings and the gate wirings, a further detailed description will be omitted.

Each of the plurality of pixels $P_{11}$, . . . , $P_{nm}$ includes a liquid crystal element 20, a first holding unit A1, a first buffer circuit B1, a first switch S1, a second holding unit A2, a second buffer circuit B2, a second switch S2, and a holding capacitance C3. In this case, a description will be given of the pixel $P_{ij}$ in the i-th row and the j-th column.

The liquid crystal element 20 has a configuration in which a liquid crystal layer LC is sandwiched between a pixel drive electrode (also referred to as a reflection electrode) PE and a common electrode CE that face each other. A common voltage Vcom is supplied to the common electrode CE from the controller 16.

The first holding unit A1 has a pixel selection transistor Q1 and a holding capacitance C1. The gate of the pixel selection transistor Q1 is connected to the corresponding gate wiring $gat_1$. The drain of the pixel selection transistor Q1 is connected to the corresponding data wiring $d+_j$. One end of the holding capacitance C1 is connected to the source of the pixel selection transistor Q1, and the other end of the holding capacitance C1 is connected to ground GND. When the corresponding gate wiring $gat_1$ is driven, the pixel selection transistor Q1 of first holding unit A1 conducts, samples the positive polarity video signal of the corresponding data wiring $d+_j$, and holds the signal in the holding capacitance C1.

The input terminal in of the first buffer circuit B1 is connected to a connection node between the pixel selection transistor Q1 and the holding capacitance C1. The first buffer circuit B1 receives the positive polarity video signal held in the first holding unit A1, performs impedance conversion, and outputs the received positive polarity video signal. As will be described later, the bias current is controlled in the first buffer circuit B1 according to a bias voltage received from the corresponding bias wiring $b_i$.

One end of the first switch S1 is connected to the output terminal out of the first buffer circuit B1. The other end of the first switch S1 is connected to the pixel drive electrode PE. The first switch S1 conducts or is shut off in accordance with the gate control signal received from the corresponding control signal wiring $s+_i$. The first switch S1 during conduction applies the positive polarity video signal output from the first buffer circuit B1 to the pixel drive electrode PE. The first switch S1 can be comprised of a transistor.

The second holding unit A2 has a pixel selection transistor Q2 and a holding capacitance C2. The gate of the pixel selection transistor Q2 is connected to the corresponding gate wiring $gat_i$. The drain of the pixel selection transistor Q2 is connected to the corresponding data wiring $d-_j$. One end of the holding capacitance C2 is connected to the source of the pixel selection transistor Q2, and the other end of the holding capacitance C2 is connected to ground GND. When the corresponding gate wiring $gat_1$ is driven, the pixel selection transistor Q2 of the second holding unit A2 conducts, samples the negative polarity video signal of the corresponding data wiring $d-_j$, and holds the signal in the holding capacitance C2.

The input terminal in of the second buffer circuit B2 is connected to a connection node between the pixel selection transistor Q2 and the holding capacitance C2. The second buffer circuit B2 receives the negative polarity video signal held in the second holding unit A2, performs impedance conversion, and outputs the received negative polarity video signal. As will be described later, the bias current is controlled in the second buffer circuit B2 according to a bias voltage received from the corresponding bias wiring $b_i$.

One end of the second switch S2 is connected to the output terminal out of the second buffer circuit B2. The other end of the second switch S2 is connected to the pixel drive electrode PE. The second switch S2 conducts or is shut off in accordance with the gate control signal received from the corresponding control signal wiring $s-_i$. The second switch S2 during conduction applies the negative polarity video signal output from the second buffer circuit B2 to the pixel drive electrode PE. The second switch S2 can be comprised of a transistor.

The holding capacitance C3 is connected between the ground GND and a common connection node connected to the other end of the first switch S1 and the other end of the second switch S2. The holding capacitance C3 is a capacitor for driving a liquid crystal.

Figure 2:
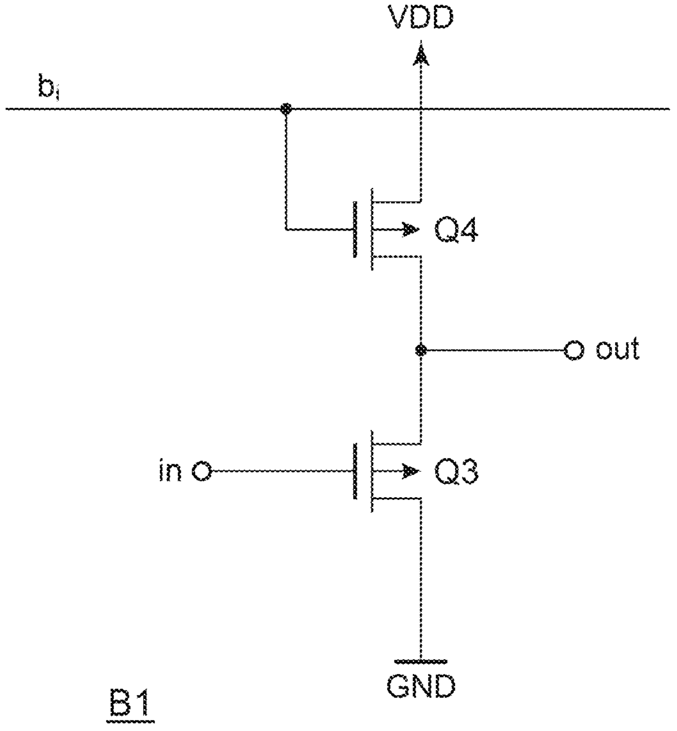
FIG. 2 is a circuit diagram of the first buffer circuit of FIG. 1.

FIG. 2 is a circuit diagram of the first buffer circuit B1 of FIG. 1. The first buffer circuit B1 and the second buffer circuit B2 have the same circuit configuration. In this case, a description will be given of the first buffer circuit B1 in the pixel in the i-th row.

The first buffer circuit B1 has a transistor Q3 and a transistor Q4. The transistor Q3 and the transistor Q4 constitute a source follower circuit for impedance conversion. The transistor Q3 and the transistor Q4 are PMOS transistors. The source follower circuit may be comprised of an NMOS transistor.

The signal input to the gate of the transistor Q3 is level-shifted and output from the source of the transistor Q3. The drain of the transistor Q3 is connected to ground GND.

The transistor Q4 functions as a constant current source. The drain of the transistor Q4 is connected to the source of the transistor Q3, and the source of the transistor Q4 is supplied with a power supply voltage VDD. The gate of the transistor Q4 is connected to the corresponding bias wiring $b_i$. When the voltage of the bias wiring $b_i$ is a predetermined bias voltage lower than the power supply voltage VDD, the transistor Q4 induces a predetermined constant current corresponding to the bias voltage in the source follower circuit as a bias current. When the voltage of the bias wiring $b_i$ is equal to the power supply voltage VDD, the transistor Q4 does not induce a bias current.

The input impedance of this source follower circuit is substantially infinite. For this reason, the charge accumulated in each of the holding capacitances C1, C2 is retained without being substantially leaked until a new signal is written after one vertical scanning period.

The operation of the liquid crystal display apparatus 100 will now be described. A positive polarity video signal is supplied to the positive polarity signal wiring vs+ and a negative polarity video signal is supplied to the negative polarity signal wiring vs− from an external video signal generation circuit (not shown) outside the liquid crystal display apparatus 100. The positive polarity video signal is a positive voltage with respect to the common voltage Vcom, and the negative polarity video signal is a negative voltage with respect to the common voltage Vcom.

The vertical drive circuit 12 drives the gate wiring $gat_1$ in the first horizontal scanning period of the current frame to cause the pixel selection transistors Q1, Q2 of each of the pixels $P_{11}, \ldots, P_{1m}$ in the first row to conduct.

The horizontal drive circuit 10 causes the selection switches $S+_1$, $S-_1$ to conduct in the first horizontal scanning period to supply the positive polarity video signal of the positive polarity signal wiring vs+ to the data wiring $d+_1$ and supply the negative polarity signal of the negative polarity signal wiring vs− to the data wiring $d-_1$.

This causes the positive polarity video signal supplied from the data wiring $d+_1$ to be written in the holding capacitance C1 in the pixel Pu via the pixel selection transistor Q1. In parallel with this, the negative polarity video signal supplied from the data wiring $d-_1$ is written in the holding capacitance C2 in the pixel $P_{11}$ via the pixel selection transistor Q2.

Subsequently, the positive polarity video signal and the negative polar video signal are sequentially written in the holding capacitances C1, C2 of each of the remaining pixels $P_{12}, \ldots, P_{1m}$ in the first row in the first horizontal scanning period.

Subsequently, the vertical drive circuit 12 stops driving the gate wiring $gat_1$ when the first horizontal scanning period ends to shut off the pixel selection transistors Q1, Q2 of each of the pixels $P_{11}, \ldots, P_{1m}$ in the first row. This causes the positive polarity video signal and the negative polar video signal to be held in the holding capacitances C1, C2 in each of the pixels $P_{11}, \ldots, P_{1m}$ in the first row until the video signal is written in the first horizontal scanning period of the next frame, when the pixel selection transistors Q1 and Q2 are turned on next time. In the plurality of pixels in the second and subsequent rows, too, the positive polarity video signal and the negative polar video signal are sequentially written and held in the same manner as described above.

The positive polarity video signal held in the holding capacitance C1 is read out via the first buffer circuit B1, selected by the first switch S1, and applied to the pixel drive electrode PE. Meanwhile, the negative polarity video signal held in the holding capacitance C2 is read out via the second buffer circuit B2, selected by the second switch S2 and applied to the pixel drive electrode PE, selection by the second switch S2 and selection by the first switch S1 being exclusive. In this way, the liquid crystal element 20 is driven by AC by changing the drive voltage Vpe of the pixel drive electrode PE to be positive or negative with respect to the common voltage Vcom.

With this configuration, the liquid crystal element 20 can be driven by AC provided that the positive polarity video signal and the negative polarity video signal are written in the holding capacitances C1, C2 in each pixel once per frame, by alternately activating the first switch S1 and the second switch S2 as many times as desired during a period until the positive polarity video signal and the negative polarity video signal of the next frame are written.

That is, independent of the writing period of the video signal, the liquid crystal element 20 can be driven AC at a frequency higher than the vertical scanning frequency. This makes it possible to obtain benefits such as prevention of burn-in, improvement in reliability, and improvement in display quality. Further, the common voltage Vcom of the liquid crystal element 20 can be changed according to the polarity reversal of the drive voltage Vpe so that the voltage of the video signal can be reduced.

In order to suppress the current consumption, pulse driving that enables the first buffer circuit B1, the second buffer circuit B2, the first switch S1, and the second switch S2 only during a period necessary for signal reading is executed. The holding capacitance C3 is provided for this operation. During an enable period, the video signal through the first switch S1 or the second switch S2 that is conducting is written in the holding capacitance C3. When both switches are non-conductive, the written video signal is held in the holding capacitance C3 to drive the liquid crystal element 20. In this way, it is possible to drive the liquid crystal element 20 by AC at a frequency higher than the vertical scanning frequency, while preventing a significant increase in the power consumption.

AC driving control of the liquid crystal display apparatus of the comparative example recognized by us will be described. The configuration of the liquid crystal display apparatus of the comparative example is the same as the configuration of the liquid crystal display apparatus 100 of FIG. 1, but they differ in how the apparatus is controlled.

Figure 3:
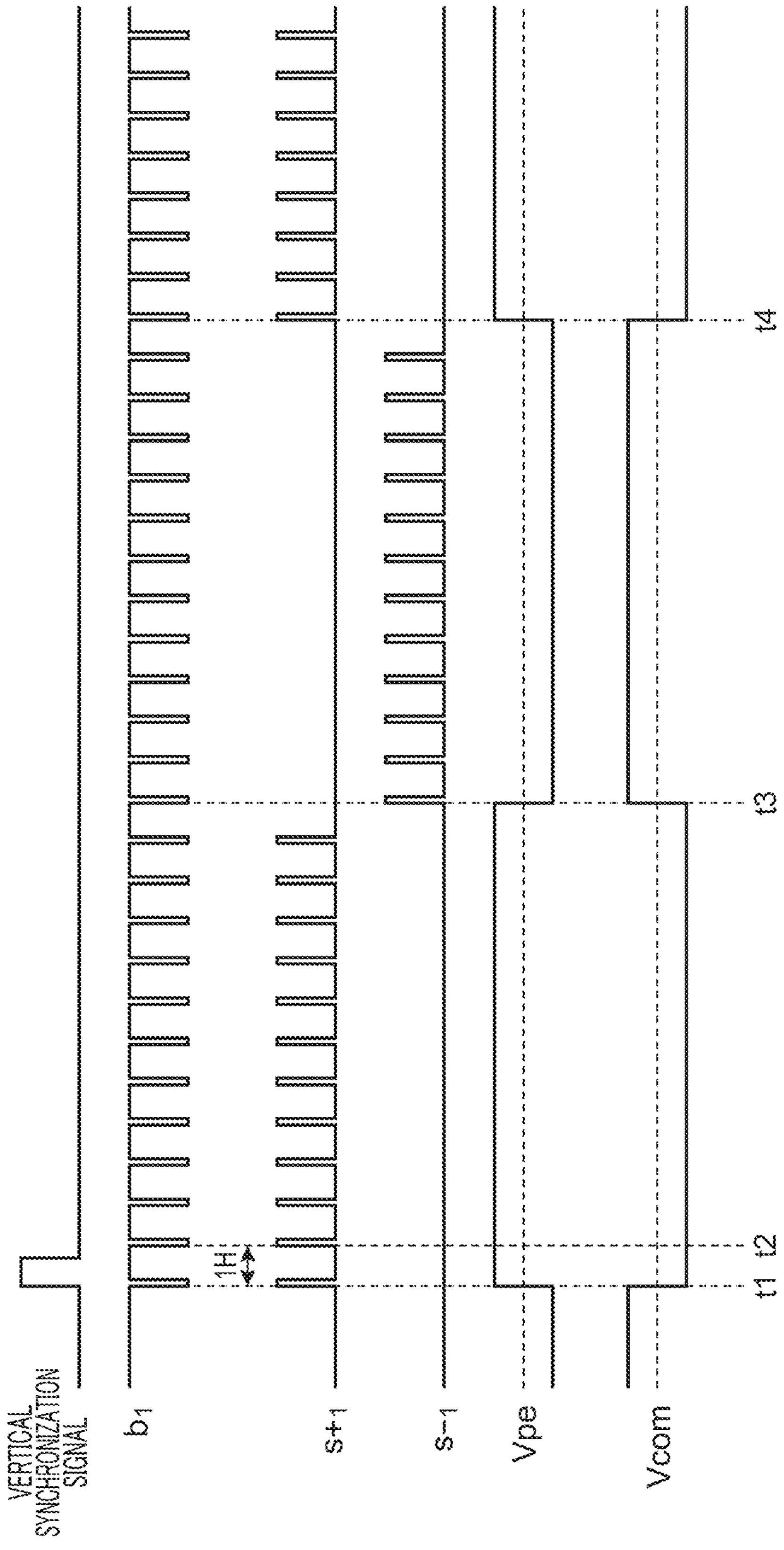
FIG. 3 is a timing chart for illustrating the operation of the liquid crystal display apparatus of the comparative example.

FIG. 3 is a timing chart for illustrating the operation of the liquid crystal display apparatus of the comparative example. The operation will now be described using the configuration of FIG. 1. FIG. 3 shows a signal waveform related to the pixel $P_{11}$. FIG. 3 shows the vertical synchronization signal, the bias voltage of the bias wiring $b_1$, the gate control signal of the control signal wiring $s+_1$, the gate control signal of the control signal wiring $s-_1$. the drive voltage Vpe of the pixel drive electrode PE, and the common voltage Vcom.

The bias voltage of the bias wiring $b_1$ is reduced in a pulse form at each horizontal scanning period denoted by "1H" in FIG. 3. The period from time t1 to time t2 is the horizontal scanning period. Thus, a pulsed constant current flows intermittently in the source follower circuit of the first buffer circuit B1 and the second buffer circuit B2 at each horizontal scanning period. In FIG. 3, the width of each pulse is exaggerated in order to clarify the drawing.

In a period from time t1 to time t3, the gate control signal of the control signal wiring $s+_i$ rises to a high level in a pulse form at each horizontal scanning period in synchronization with the pulse of the bias voltage of the bias wiring $b_1$, and the gate control signal of the control signal wiring $s-_1$ keeps a low level. This causes the drive voltage Vpe to be equal to the voltage of the positive polarity video signal from time t1 to time t3.

In a period from time t3 to time t4, the gate control signal of the control signal wiring $s+_i$ keeps a low level, and the gate control signal of the control signal wiring $s-_1$ rises to a high level in a pulse form at each horizontal scanning period in synchronization with the pulse of the bias voltage of the bias wiring $b_1$. This causes the drive voltage Vpe to be equal to the voltage of the negative polarity video signal from time t3 to time t4. After time t4, the operation from time t1 to time t4 is repeated.

In the comparative example, a constant current flows intermittently in the source follower circuit of the first buffer circuit B1 and the second buffer circuit B2 at each horizontal scanning period. We have recognized that the current consumption is relatively large in the comparative example and that there is room to reduce the current consumption. In the first embodiment, therefore, the element is AC-driven as described below to reduce the current consumption.

Figure 4:
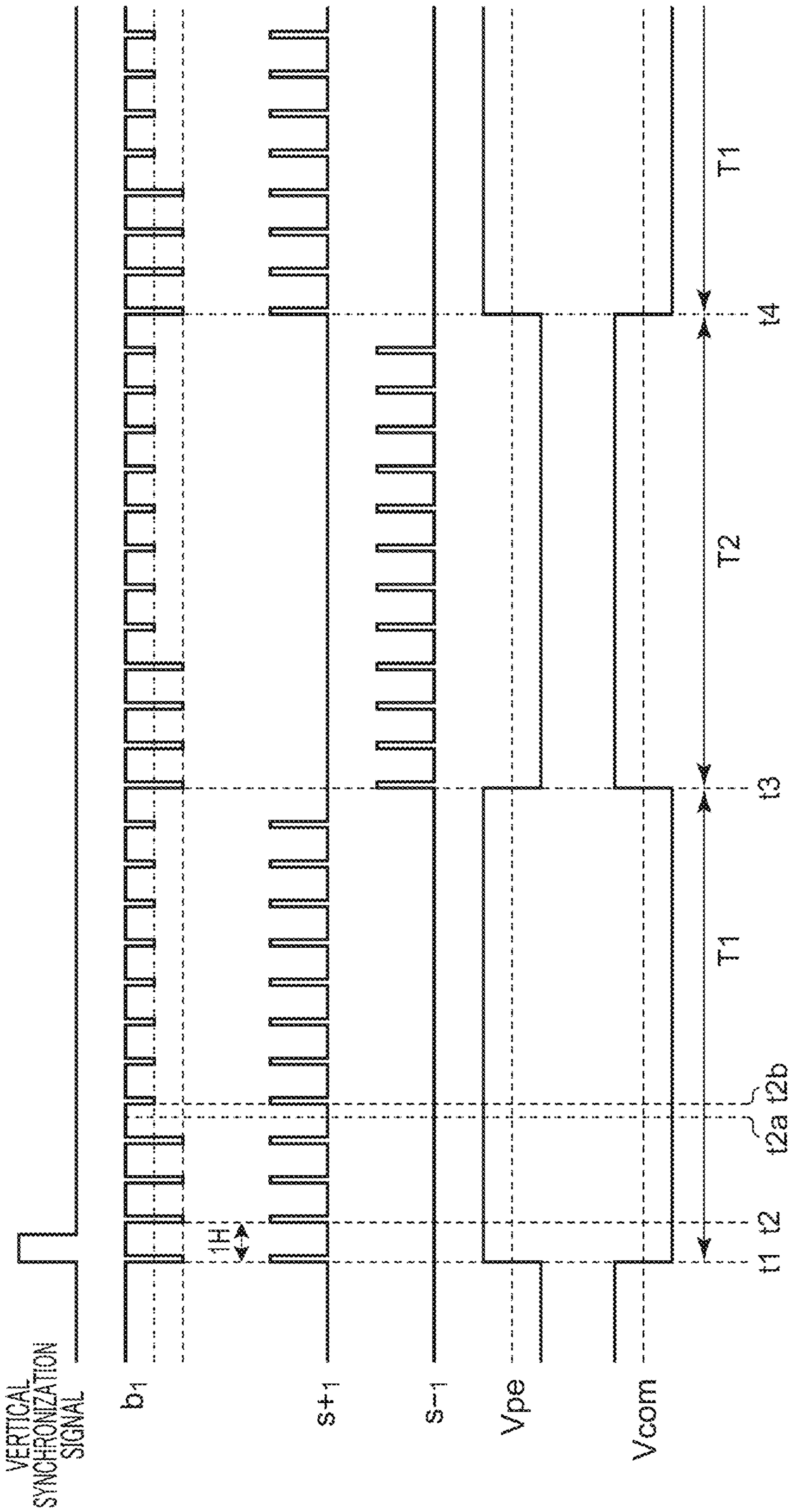
FIG. 4 is a timing chart for illustrating the operation of the liquid crystal display apparatus of FIG. 1.

FIG. 4 is a timing chart for illustrating the operation of the liquid crystal display apparatus 100 of FIG. 1. FIG. 4 shows a signal waveform related to the pixel $P_{11}$. Like FIG. 3, FIG. 4 shows the vertical synchronization signal, the bias voltage of the bias wiring $b_1$, the gate control signal of the control signal wiring $s+_1$, the gate control signal of the control signal wiring $s-_1$. the drive voltage Vpe of the pixel drive electrode PE, and the common voltage Vcom.

Referring to FIG. 4, the bias voltage of the bias wiring $b_1$ differs from that of the comparative example of FIG. 3. After time t1, after time t3, and after time t4, the amount of reduction in the bias voltage of the bias wiring $b_i$ from the power supply voltage VDD is smaller in the fifth to twelfth pulses than in the first to fourth pulses. Since the amount of reduction in the bias voltage is small, the current flowing through the transistor Q4 of the source follower circuit of FIG. 2 concurrently will be smaller than the reference value. The proportion of the bias current of the source follower circuit of the plurality of pixels to the overall current consumption of the liquid crystal display apparatus 100 is relatively large. Since the bias current of the source follower circuit corresponding to the fifth and subsequent pulses becomes smaller than the reference value, it is possible to suppress the overall current consumption of the liquid crystal display apparatus 100.

When the bias current of the source follower circuit decreases, the output voltage of the first buffer circuit B1 and the second buffer circuit B2 changes. Since it is a minor change, however, it does not affect the operation.

Further, even if the bias current of the source follower circuit is decreased, the drive voltage Vpe can be kept generally constant during each of the first period T1 and the second period T2 owing to the holding capacitance C3.

In the first period T1 in the vertical scanning period, the polarity switching control circuit 14 supplies the gate control signal embodied by a plurality of pulses to the control signal wiring $s+_i$ and causes the first switch S1 to conduct intermittently at each predetermined unit period. In each of the plurality of pixels $P_{11}$, . . . . $P_{1m}$ in the first row, the first switch S1 conducts intermittently at the same point of time. Hereinafter, the unit period is, for example, a horizontal scanning period. By configuring the unit period to be the horizontal scanning period, timing design is easy. In the example of FIG. 4, the first period T1 is 12 times the duration of the horizontal scanning period, but the embodiment is not limited thereto. The pulse width of the gate control signal, the duration of the first period T1, and the duration of the unit period can be appropriately determined by experiment or simulation.

In the second period T2 following the first period T1 in the vertical scanning period, the polarity switching control circuit 14 supplies the gate control signal embodied by a plurality of pulses to the control signal wiring $s-_1$ and causes the second switch S2 to conduct intermittently at each unit period. In each of the plurality of pixels $P_{11}$, . . . , $P_{1m}$ in the first row, the second switch S2 conducts intermittently at the same point of time. The second period T2 has the same duration as the first period T1. The vertical scanning period includes a plurality of first periods T1 and a plurality of second periods T2. The first period T1 and the second period T2 are arranged alternately.

The polarity switching control circuit 14 supplies the bias voltage that drops in a pulse form to the bias wiring $b_1$ and intermittently induces the bias current in a pulse form in the first buffer circuit B1 and the second buffer circuit B2 in synchronization with the conduction of the first switch S1 or the second switch S2. In each of the plurality of pixels $P_{11}, \ldots, P_{1m}$ in the first row, the bias current flows intermittently at the same point of time. In each of the first period T1 and the second period T2, the polarity switching control circuit 14 causes the bias current of the first buffer circuit B1 and the second buffer circuit B2 to be equal to the reference value in some of the plurality of unit periods. In the remaining unit periods, the polarity switching control circuit 14 decreases the bias current from the reference value.

Some of the unit periods in the first period T1 are two or more unit periods beginning with the first unit period in the first period T1 and are represented by the four unit periods in the example of FIG. 4. Some of the unit periods in the second period T2 are two or more unit periods beginning with the first unit period in the second period T2 and are represented by four unit periods of FIG. 4. The number of some of the unit periods may be determined as appropriate by experiment or simulation. That is, at the beginning of the first period T1, the positive polarity video signal is applied to the pixel drive electrode PE a plurality of times continuously while the driving capability of the first buffer circuit B1 is relatively high, and, at the beginning of the second period T2, the negative polarity video signal is applied to the pixel drive electrode PE a plurality of times continuously while the driving capability of the second buffer circuit B2 is relatively high. Thereby, the holding capacitance C3 can be properly charged.

The polarity switching control circuit 14 may supply the gate control signal in a pulse form to the control signal wiring $s+_2$ so that the pulse rises immediately after the pulse of the control signal wiring $s+_i$ falls in each unit period in the first period T1 and may also cause the first switch S1 of the plurality of pixels $P_{21}, \ldots, P_{2m}$ in the second row to conduct intermittently at each period, although illustration of the operation is omitted. That is, the conduction period of the first switch S1 in the second row may start immediately after the end of the conduction period of the first switch S1 in the first row. Similarly, in each unit period in the second period T2, the conduction period of the second switch S2 in the second row may start immediately after the end of the conduction period of the second switch S2 in the first row. Similarly, in each of the unit period in the first period T1 and the second period T2, the period in which the bias current of the second row flows may start immediately after the end of the period in which the bias current of the first buffer circuit B1 and the second buffer circuit B2 in the first row flows. The plurality of pixels in the third and subsequent rows may be controlled in the same way. In the horizontal scanning period from time t1 to time t2, for example, the time when the conduction period of the first switch S1 in the n-th row ends and when the bias current in n-th row ceases to flow may precede time t2. For example, time t2 may be preceded by about ½ to ⅓ the horizontal scanning period. Other horizontal scanning periods may be controlled as well.

Therefore, in each unit period in the first period T1, the conduction period of the first switch S1 may differ from one row to another, and the first switches S1 in different rows may not conduct at the same time. In each unit period in the second period T2, the conduction period of the second switch S2 may differ from one row to another, and the second switches S2 of different rows may not conduct at the same time. In each unit period in the first period T1 and the second period T2, the period in which the bias current flows in the first buffer circuit B1 and the second buffer circuit B2 may differ from one row to another, and the bias current may not flow simultaneously in the first buffer circuits B1 and the second buffer circuits B2 in different rows. In this case, it is possible to suppress an uneven increase in the current consumption over time.

According to the embodiment, the current consumption in each pixel can be reduced so that the current consumption in the liquid crystal display apparatus 100 can be reduced as compared to the comparative example.

Figure 5:
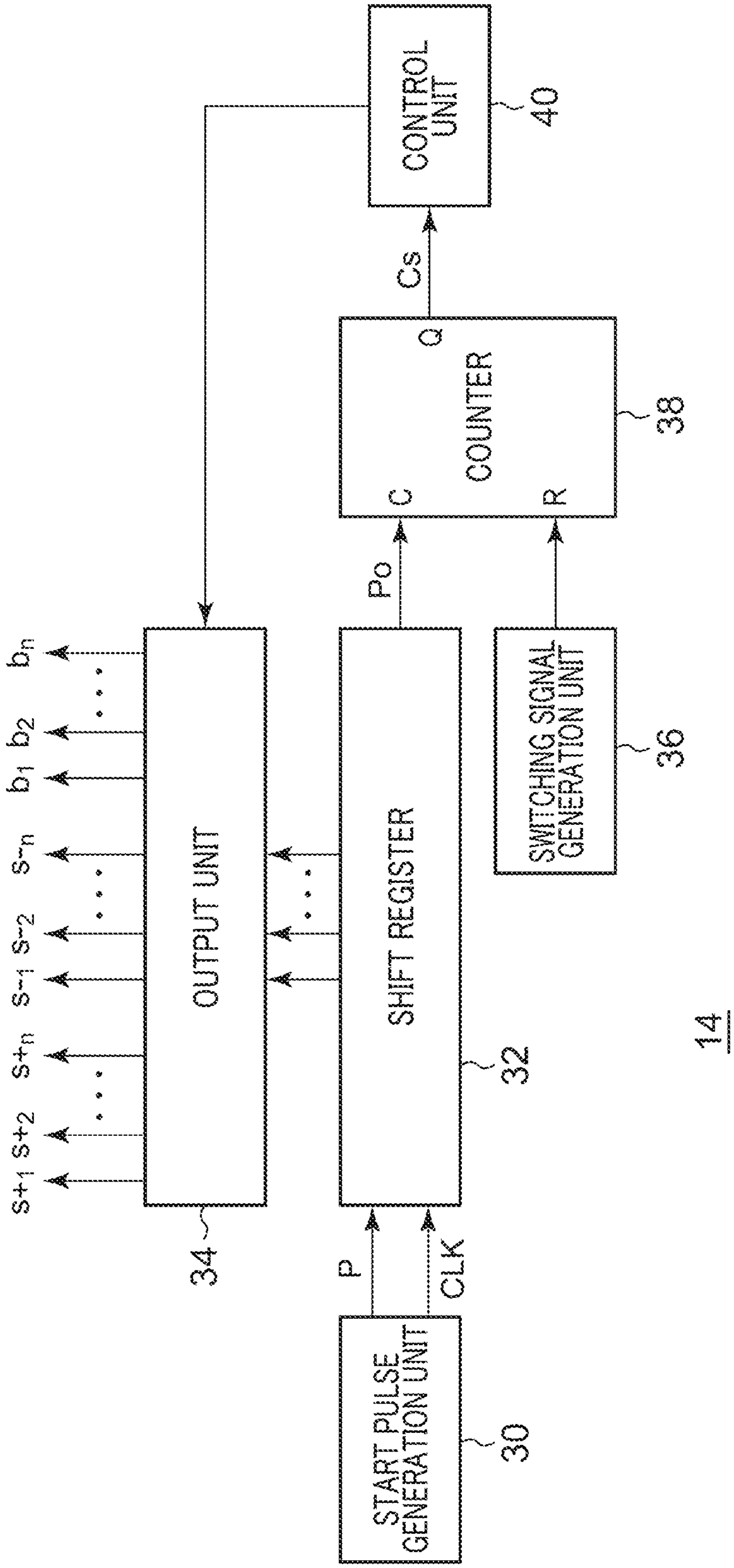
FIG. 5 shows a functional configuration of the polarity switching control circuit of FIG. 1.

FIG. 5 shows a functional configuration of the polarity switching control circuit 14 of FIG. 1. The polarity switching control circuit 14 includes a start pulse generation unit 30, a shift register 32, an output unit 34, a switching signal generation unit 36, a counter 38, and a control unit 40.

A description will be given with reference also to FIG. 4 as appropriate. The start pulse generation unit 30 generates a start pulse P at each unit period and generates a clock CLK having a predetermined period that is significantly shorter than the unit period. A plurality of start pulses P are signals in which a plurality of pulses of the control signal wiring $s+_1$ of FIG. 4 are repeated. The start pulse generation unit 30 supplies the generated start pulse P and the clock CLK to the shift register 32.

The shift register 32 shifts the received start pulse P at each clock CLK and outputs the shifted pulse. Further, when the shift register 32 shifts the received start pulse P the same number of times as the number of gate wirings, i.e., n times, the shift register 32 outputs an output pulse Po. The shift register 32 supplies the shifted pulse to the output unit 34 and supplies the output pulse Po to the clock terminal of the counter 38.

The control signal wirings $s+_i, \ldots, s+_n$, the control signal wirings $s-_1, \ldots, s-_n$, and the bias wirings $b_1, \ldots, b_n$ are connected to the output unit 34. Based on the shifted pulse output from the shift register 32 at each clock CLK, the output unit 34 outputs a control signal to control the first switch S1 of each of the plurality of pixels, a control signal to control the second switch S2, and a control signal to control the bias current of the first buffer circuit B1 and the second buffer circuit B2. The output unit 34 outputs a pulse of the gate control signal to the control signal wiring $s+_1$ and outputs a pulse of the bias voltage to the bias wiring $b_i$ in synchronization with the pulse output from the shift register 32 at the first clock CLK in response to the first start pulse P output at time t1 of FIG. 4. These pulses correspond to the first pulses immediately after time t1 of FIG. 4. Similarly, the output unit 34 outputs the pulse of the gate control signal to the control signal wiring $s+_i$ and outputs the pulse of the bias voltage to the bias wiring $b_i$ in synchronization with the pulse output from the shift register 32 at the i-th clock CLK. As described above, the timing of outputting the pulse to the control signal wiring $s+_n$ and the bias wiring $b_n$ in the n-th row precedes time t2. Thereafter, the output unit 34 does not output a pulse until time t2. Subsequently, the second start pulse P is output at time t2 of FIG. 4, and the output unit 34 outputs pulses in the same manner as in the case of the first start pulse P.

The counter 38 counts the number of output pulses Po of the shift register 32 supplied to the clock terminal. When the counted number reaches the number of some of the unit periods described above, the counter 38 outputs the control signal Cs to the control unit 40. That is, when as many pulses as the number of some of the unit periods are output in the bias wiring $b_n$ in the n-th row, the control signal Cs is output in synchronization with the next clock CLK. In the example of FIG. 4, the number of some of the unit periods is "4", and, for example, the control signal Cs is output at time t2*a*. The number of some of the unit periods may be changeable by changing the setting of the counter 38 from outside the liquid crystal display apparatus 100. As a result, the current consumption and display quality can be changed according to the situation.

When the control unit 40 receives the control signal Cs, the control unit 40 outputs an instruction signal for decreasing the bias current to the output unit 34. When the output unit 34 receives the instruction signal from the control unit 40, the output unit 34 outputs the pulse of the bias voltage with a decreased amount of reduction to the bias wiring $b_i$ in synchronization with the pulse output from the shift register 32 at the i-th clock CLK in the next and subsequent unit periods to decrease the bias current from the reference value.

Thus, the counter 38 counts the output pulse Po of the shift register 32. Thereby, a temporal margin of operation of the circuit can be secured. That is, in the example of FIG. 4, a certain time is available after time t1 between time t2*a* when the fourth output pulse Po is output in response to the fourth start pulse P and time t2*a* when the fifth start pulse P is output. During this period, therefore, control to decrease the amount of reduction in the pulse of the bias voltage in accordance with the instruction signal received by the output unit 34 from the control unit 40 can be completed. Accordingly, sufficient temporal margin for operation can be secured. That is, in FIG. 4, the pulse of the bias voltage with a decreased amount of reduction can be output to the bias wiring $b_i$ immediately after time t2*b*, when the fifth start pulse P is output.

Another comparative example in which the counter 38 counts the number of start pulses P is conceivable. In this case, when the fifth start pulse P is output at time t2*b*, the count reaches 5, the control signal Cs is output, and the instruction signal for decreasing the bias current is sent to the output unit 34. When the instruction signal is sent, the pulse of the bias voltage of the bias wiring $b_i$ immediately after the time t2*b* is already output. Therefore, the amount of reduction in the pulse of the bias wiring $b_i$ cannot be decreased, and the bias current of the first buffer circuit B1 in the first row, etc. does not decrease. In addition, there is a possibility that the pulse of the bias voltage of some of the remaining bias wirings (e.g., the bias wiring b2) cannot be controlled in time to decrease the amount of reduction. According to the embodiment, an operation like this can be avoided. The quality of the image can be maintained, and the current consumption can be further reduced.

The switching signal generation unit 36 generates a switching signal for switching between the positive polarity and the negative polarity and supplies the switching signal to the reset terminal of the counter 38. At the time t3 of FIG. 4, when the first period T1 has elapsed since time t1, the switching signal is supplied to the counter 38. As a result, the control signal Cs output from the counter 38 is reset. When the control signal Cs is reset, the control unit 40 stops outputting the instruction signal for decreasing the bias current. When the supply of the instruction signal from the control unit 40 is stopped, the output unit 34 restores the amount of reduction in the pulse of the bias voltage to original so that the bias current is returned to the reference value.

Further, the output unit 34 outputs the pulse of the gate control signal to the control signal wiring $s-_1$ and outputs the pulse of the bias voltage to the bias wiring $b_i$ in synchronization with the pulse output from the shift register 32 at the first clock CLK in response to the first start pulse P of the second period T2 output at time t3 of FIG. 4. These pulses correspond to the first pulses immediately after time t3 of FIG. 4. Pulses are output in the same way after time t3. Further, the switching signal generation unit 36 outputs the switching signal to the counter 38 at time t4. The subsequent operation is similarly performed.

Second Embodiment

The second embodiment differs from the first embodiment in that the bias current is not induced in the first buffer circuit and the second buffer circuit in the remaining unit periods. The following description highlights the difference from the first embodiment.

The configuration of the liquid crystal display apparatus 100 is the same as that of FIG. 1. Control by the polarity switching control circuit 14 differs from that of the first embodiment.

Figure 6:
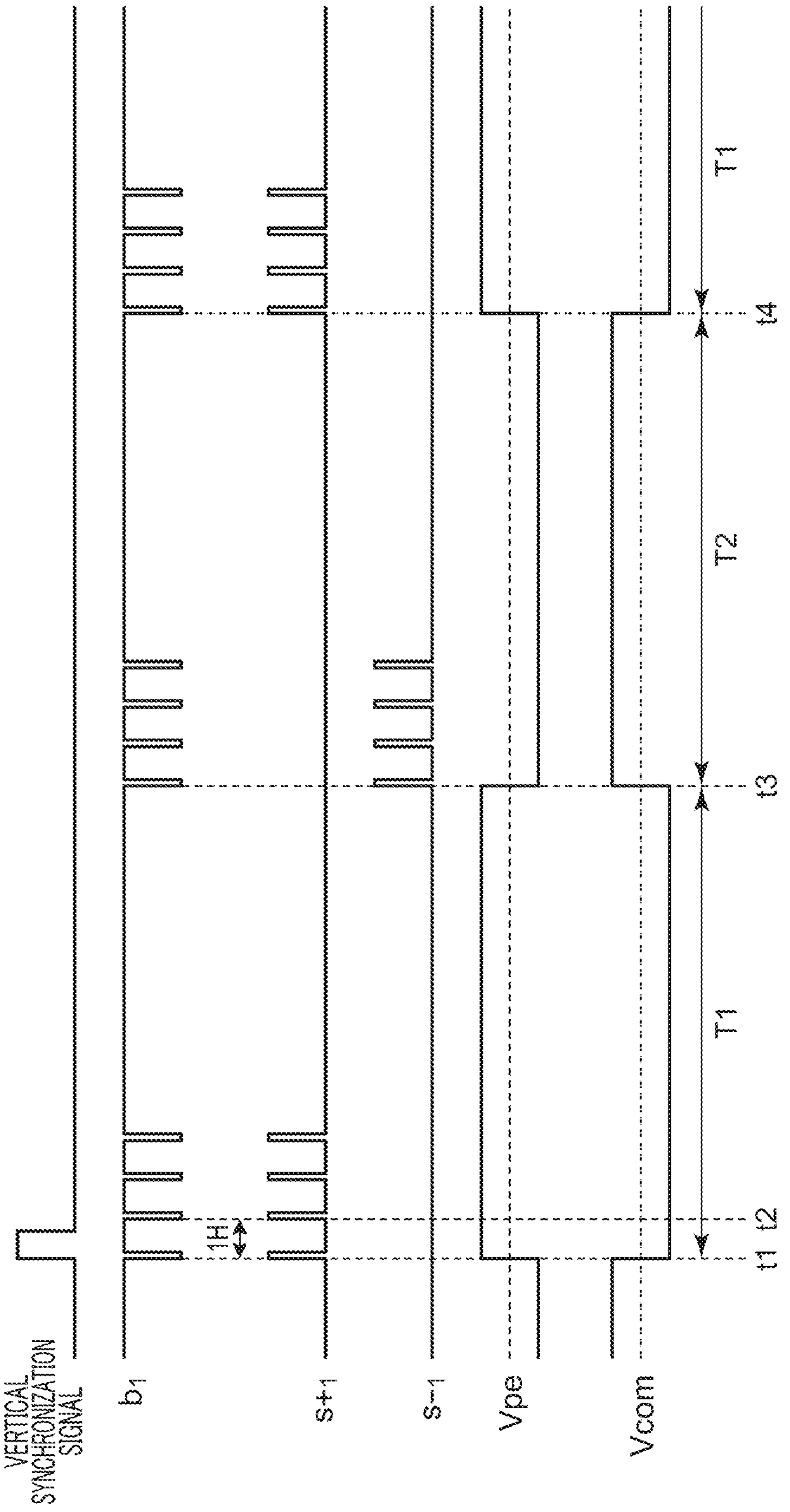
FIG. 6 is a timing chart for illustrating the operation of the liquid crystal display apparatus of the second embodiment.

FIG. 6 is a timing chart for illustrating the operation of the liquid crystal display apparatus 100 of the second embodiment. FIG. 6 shows signals also shown in FIG. 4.

Referring to FIG. 6, the bias voltage of the bias wiring $b_1$, the gate control signal of the control signal wiring $s+_1$, and the gate control signal of the control signal wiring $s-_1$ are different from those of FIG. 4. After time t1, after time t3, and after time t4, the first to fourth pulses are the same as those of FIG. 4. FIG. 6 differs from FIG. 4 in that the fifth and subsequent pulses are not available. After the fourth pulse, the bias voltage of the bias wiring $b_i$ is maintained at the power supply voltage VDD so that no currents flow in the transistor Q4 of the source follower circuit of FIG. 2. Therefore, the current consumption can be reduced more successfully than in the first embodiment.

Even if the bias current of the source follower circuit is stopped, the drive voltage Vpe can be kept generally constant during each of the first period T1 and the second period T2 owing to the holding capacitance C3.

In the first period T1, the polarity switching control circuit 14 supplies the gate control signal embodied by a plurality of pulses to the control signal wiring $s+_1$ in some of the plurality of unit periods and causes the first switch S1 to conduct intermittently at each predetermined unit period. In the remaining unit periods, the polarity switching control circuit 14 does not supply the gate control signal in a pulse form to the control signal wiring $s+_1$ and shuts off the first switch S1.

In the second period T2 following the first period T1, the polarity switching control circuit 14 supplies the gate control signal embodied by a plurality of pulses to the control signal wiring $s-_1$ and causes the second switch S2 to conduct intermittently at each predetermined unit period. In the remaining unit periods, the polarity switching control circuit 14 does not supply the gate control signal in a pulse form to the control signal wiring $s-_1$ and shuts off the second switch S2.

In each of the first period T1 and the second period T2, the polarity switching control circuit 14 causes the bias current of the first buffer circuit B1 and the second buffer circuit B2 to be equal to the reference value in some of the plurality of unit periods. In the remaining unit periods, the polarity switching control circuit 14 does not induce the bias current in the first buffer circuit B1 and the second buffer circuit B2.

In each of some of the unit periods in the first period T1, the conduction period of the first switch S1 may differ from one row to another, and the first switches S1 in different rows may not conduct at the same time. In each of some of the unit periods in the first period T1, the period in which the bias current flows in the first buffer circuit B1 and the second buffer circuit B2 may differ from one row to another, and the bias current may not flow simultaneously in the first buffer circuits B1 and the second buffer circuits B2 in different rows. In each of some unit periods in the second period T2, the conduction period of the second switch S2 may differ from one row to another, and the second switches S2 in different rows may not conduct at the same time. In each of some of the unit periods in the second period T2, the period in which the bias current flows in the first buffer circuit B1 and the second buffer circuit B2 may differ from one row to another, and the bias current may not flow simultaneously in the first buffer circuits B1 and the second buffer circuits B2 in different rows.

Figure 7:
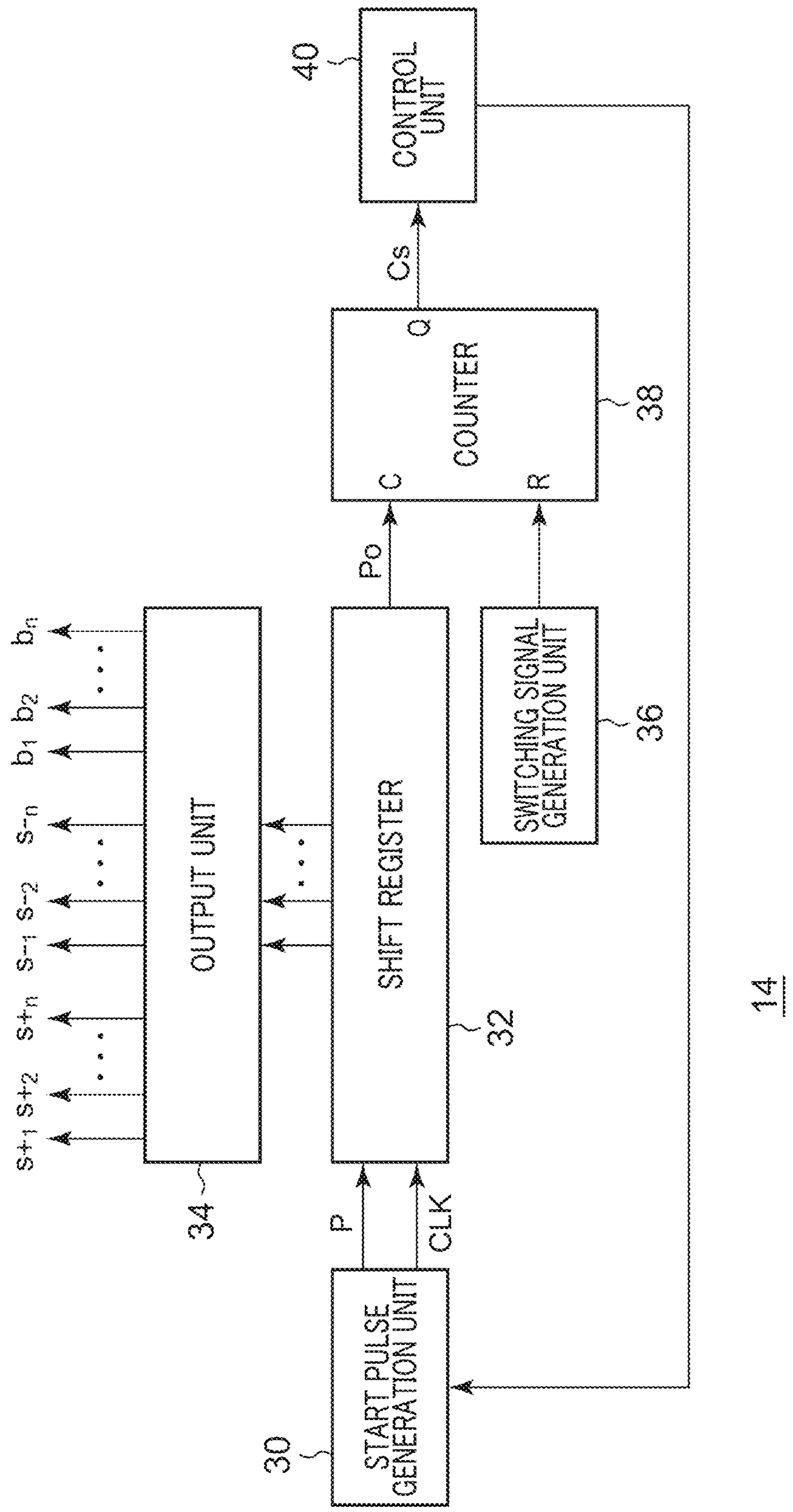
FIG. 7 shows a functional configuration of the polarity switching control circuit of the second embodiment.

FIG. 7 shows a functional configuration of the polarity switching control circuit 14 of the second embodiment. In the polarity switching control circuit 14, the functions of the control unit 40 and the start pulse generation unit 30 differ from those of the first embodiment.

When the control unit 40 receives the control signal Cs in response to the number of output pulses Po counted by the counter 38 reaching the number of some of the unit periods described above, the control unit 40 outputs a instruction signal for stopping the pulse to the start pulse generation unit 30. As in the first embodiment, the number of some of the unit periods may be changeable by externally changing the setting of the counter 38. Thereby, the current consumption, etc. can be changed according to the situation.

When the start pulse generation unit 30 receives the instruction signal from the control unit 40, the start pulse generation unit 30 stops generating and outputting the start pulse P and the clock CLK. Thereby, the output unit 34 thereafter stops outputting the pulse to the control signal wirings $s+_1, \ldots, s+_n$, the control signal wirings $s-_1, \ldots, s-_n$ and the bias wirings $b_i, \ldots, b_n$.

At time t3, when the first period T1 has elapsed since time t1 of FIG. 6, a switching signal is supplied to the counter 38 in the same manner as in the first embodiment. As a result, the control signal Cs output from the counter 38 is reset. When the control signal Cs is reset, the control unit 40 stops outputting the instruction signal to stop the pulse. When the supply of the instruction signal from the control unit 40 is stopped, the start pulse generation unit 30 resumes generating and outputting the start pulse P and the clock CLK.

The polarity switching control circuit 14 may include a reception unit that accepts a user control input and may select either the control mode of the first embodiment or the control mode of the second embodiment according to the received user control input. In this case, the control unit 40 receiving the control signal Cs outputs an instruction signal for decreasing the bias current to the output unit 34 or outputs an instruction signal to stop the pulse to the start pulse generation unit 30 in accordance with the user control input received by the reception unit. As a result, the optimal control mode can be selected according to the situation. The user may switch the control mode to check the display quality of the liquid crystal display apparatus 100 and decide which control mode to select.

Given above is a description of the present disclosure based on the embodiments. The embodiments are intended to be illustrative only and it will be understood by those skilled in the art that various modifications to combinations of constituting elements and processes are possible and that such modifications are also within the scope of the present disclosure.

What is claimed is:

1. A liquid crystal display apparatus comprising:

a plurality of pixels provided at intersections where a plurality of sets of data wirings, each set being comprised of two data wirings, and a plurality of gate wirings intersect;

a plurality of sets of selection switches provided respectively for the plurality of sets of data wirings and adapted to supply a positive polarity video signal to one of the two data wirings in a set and supply a negative polarity video signal to the other data wiring such that the plurality of sets of selection switches sequentially supply the signals to the plurality of sets of data wirings set by set;

a horizontal drive circuit that sequentially drives the plurality of sets of selection switches set by set within a horizontal scanning period;

a vertical drive circuit that sequentially drives the plurality of gate wirings in each horizontal scanning period; and a polarity switching control circuit, wherein each of the plurality of pixels includes:

a liquid crystal element in which a liquid crystal layer is sandwiched between a pixel drive electrode and a common electrode that face each other;

a first holding unit that samples and holds the positive polarity video signal of a corresponding data wiring;

a first buffer circuit that receives the positive polarity video signal held in the first holding unit;

a first switch during conduction applies the positive polarity video signal output from the first buffer circuit to the pixel drive electrode;

a second holding unit that samples and holds the negative polarity video signal of a corresponding data wiring;

a second buffer circuit that receives the negative polarity video signal held in the second holding unit; and a second switch during conduction applies the negative polarity video signal output from the second buffer circuit to the pixel drive electrode, wherein the polarity switching control circuit:

causes the first switch to conduct intermittently at each predetermined unit period, in a first period in the vertical scanning period, causes the second switch to conduct intermittently at each unit period, in a second period following the first period in the vertical scanning period, intermittently induces a bias current in the first buffer circuit and the second buffer circuit in synchronization with conduction of the first switch or the second switch, and in each of the first period and the second period, causes the bias current to be equal to a reference value in some of a plurality of unit periods and decreases the bias current from the reference value in the remaining unit periods.

2. The liquid crystal display apparatus according to claim 1, wherein the polarity switching control circuit:

in the first period, causes the first switch to conduct intermittently at each unit period in some of the plurality of unit periods and shuts off the first switch in the remaining unit periods, in the second period, causes the second switch to conduct intermittently at each unit period in some of the plurality of unit periods and shuts off the second switch in the remaining unit periods, and in each of the first period and the second period, does not induce the bias current in the first buffer circuit and the second buffer circuit in the remaining unit periods.

3. The liquid crystal display apparatus according to claim 1, wherein the unit period is the horizontal scanning period.

4. The liquid crystal display apparatus according to claim 1, wherein some of the unit periods in the first period are two or more unit periods beginning with the first unit period in the first period, and wherein some of the unit periods in the second period are two or more unit periods beginning with the first unit period in the second period.

5. The liquid crystal display apparatus according to claim 1, wherein the first buffer circuit and the second buffer circuit are source follower circuits, and wherein the bias current is a constant current flowing in the source follower circuit.

6. The liquid crystal display apparatus according to claim 1, wherein the polarity switching control circuit includes:

a start pulse generation unit that generates a start pulse at each unit period;

a shift register that shifts the start pulse at each block, outputs a shifted pulse, and outputs an output pulse when the shift register shifts the start pulse the same number of times as the number of gate wirings;

an output unit that, based on the shifted pulse output from the shift register at each clock, outputs a control signal to control the first switch of each of the plurality of pixels, a control signal to control the second switch, and a control signal to control the bias current of the first buffer circuit and the second buffer circuit; and a counter that counts the number of output pulses output from the shift register, and wherein, when the number counted by the counter reaches the number of some of the unit periods, the output unit outputs the control signal to control the bias current to decrease the bias current from the reference value.

7. The liquid crystal display apparatus according to claim 2, wherein the polarity switching control circuit includes:

a start pulse generation unit that generates a start pulse at each unit period;

a shift register that shifts the start pulse at each block, outputs a shifted pulse, and outputs an output pulse when the shift register shifts the start pulse the same number of times as the number of gate wirings;

an output unit that, based on the shifted pulse output from the shift register at each clock, outputs a control signal to control the first switch of each of the plurality of pixels, a control signal to control the second switch, and a control signal to control the bias current of the first buffer circuit and the second buffer circuit; and a counter that counts the number of output pulses output from the shift register, and wherein the start pulse generation unit stops generating the start pulse when the number counted by the counter reaches the number of some of the unit periods.

8. A control method in a liquid crystal display apparatus, the liquid crystal display apparatus including:

a plurality of pixels provided at intersections where a plurality of sets of data wirings, each set being comprised of two data wirings, and a plurality of gate wirings intersect;

a plurality of sets of selection switches provided respectively for the plurality of sets of data wirings and adapted to supply a positive polarity video signal to one of the two data wirings in a set and supply a negative polarity video signal to the other data wiring such that the plurality of sets of selection switches sequentially supply the signals to the plurality of sets of data wirings set by set;

a horizontal drive circuit that sequentially drives the plurality of sets of selection switches set by set within a horizontal scanning period; and a vertical drive circuit that sequentially drives the plurality of gate wirings in each horizontal scanning period, wherein each of the plurality of pixels includes:

a liquid crystal element in which a liquid crystal layer is sandwiched between a pixel drive electrode and a common electrode that face each other;

a first holding unit that samples and holds the positive polarity video signal of a corresponding data wiring;

a first buffer circuit that receives the positive polarity video signal held in the first holding unit;

a first switch during conduction applies the positive polarity video signal output from the first buffer circuit to the pixel drive electrode;

a second holding unit that samples and holds the negative polarity video signal of a corresponding data wiring;

a second buffer circuit that receives the negative polarity video signal held in the second holding unit; and a second switch during conduction applies the negative polarity video signal output from the second buffer circuit to the pixel drive electrode, and wherein the control method comprises:

causing the first switch to conduct intermittently at each predetermined unit period, in a first period in the vertical scanning period;

causing the second switch to conduct intermittently at each unit period, in a second period following the first period in the vertical scanning period;

intermittently inducing a bias current in the first buffer circuit and the second buffer circuit in synchronization with conduction of the first switch or the second switch, and in each of the first period and the second period, causing the bias current to be equal to a reference value in some of a plurality of unit periods and decreases the bias current from the reference value in the remaining unit periods.

* * * * *